July 10, 1956  R. KRAMER  2,754,135
RAPID PIPE COUPLING WITH MEANS TO PREVENT SEAL BLOWOUT
Filed Jan. 2, 1952

Inventor:
R. Kramer

United States Patent Office 2,754,135
Patented July 10, 1956

2,754,135

RAPID PIPE COUPLING WITH MEANS TO PREVENT SEAL BLOWOUT

Richard Kramer, Tuttlingen, Wurttemberg, Germany

Application January 2, 1952, Serial No. 264,585

Claims priority, application Germany January 5, 1951

1 Claim. (Cl. 285—101)

The invention relates to a rapid coupling for connecting a lubricating press to a high-pressure lubricating nipple provided with a collar behind which radially movable coupling elements engage which are capable of being locked by a sliding sleeve. It solves the problem of tightness between the coupling and the lubricating nipple even at the highest pressures.

According to the invention, in the longitudinal bore of the substantially cylindrical coupling body is arranged a longitudinally slidable tube through which lubricant flows during the lubricating operation and of which the outlet end is provided with a packing piston secured thereto, which, under the pressure of the lubricant subjected to pressure and surrounding the tube externally also, bears against the edge of the lubricating nipple aperture, and on the outer periphery of the coupling body pivoted clamping cheeks or jaws capable of being spread apart by resilient tension surround and grip the lubricating nipple when a sliding sleeve is slid forward. Thus the packing pressure on the piston corresponds to the pressure of the press and tightness is therefore complete. The tube is surrounded by a helical spring which at one end bears against the piston—preferably through an interposed packing collar—and at the other end against a disc slid over the tube, the disc being of greater diameter than the bore of the coupling body but of smaller diameter than an enlarged rear portion of the said bore. When the coupling is released, any stream of lubricant flowing towards the nipple-receiving end of the coupling body drives the tube in that direction, and the said disc is engaged by the flanged end of the said tube and thereby shuts off the annular space surrounding the tube. This ensures complete tightness at the piston and also prevents the piston and packing collar from being forced out if the press is operated when the coupling has been released and the lubricant could not at this moment escape through the tube only.

Figure 1:
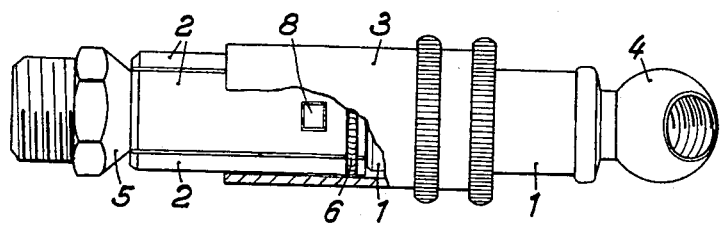
Figure 2:
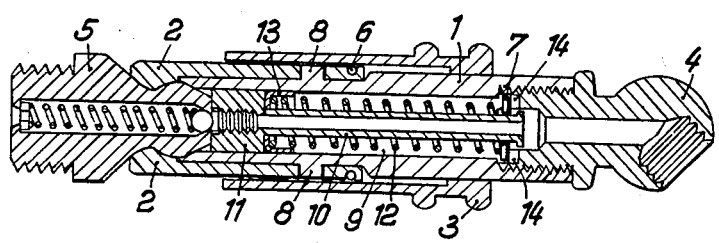
Figure 3:
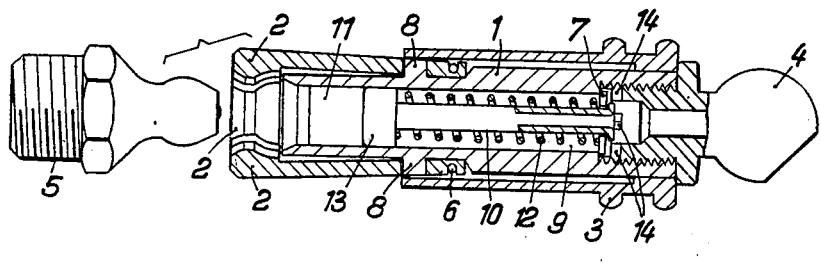

One embodiment of the invention, chosen by way of example, is illustrated in the accompanying drawings, in which:

Figure 1 shows the rapid coupling connected to a lubricating nipple, in lateral elevation, with some parts removed, Figure 2 shows the rapid coupling in the same conditions, in longitudinal section, and Figure 3 shows the rapid coupling detached from the nipple, in longitudinal section.

The coupling body proper 1 carries, near its end adjacent to the lubricating nipple 5, four cheeks or jaws 2 used for gripping the collar of the lubricating nipple, each of these jaws being held pivotally by a pin 8 on the outer periphery of the coupling body 1, the jaws being spread apart, by means of a common helical tension spring 6 surrounding the rear ends of all the jaws 2, when the sliding sleeve 3, which surrounds the jaws and in its forward position locks the jaws 2 on the lubricating nipple, is pulled back to release the coupling. The jaws 2 when closed supplement one another so as to form an annular internal collar, with no gaps, which fits into the channel behind the collar of the lubricating nipple.

The coupling body 1 is provided with a longitudinal bore 9 having a stepped rear end into which the ball head 4, for connection to the lubricating press, is screwed. In the bore 9 is a tube 10 leading the lubricant to the lubricating nipple 5, and to the front end of this tube is screwed a leather piston 11 fitting closely in the bore 9. A helical spring 12 surrounding the tube 10 bears at the front against a leather collar 13 slid over the tube 10 and at the rear against a disc 7, slid over the tube 10, which is in the stepped part of the tube 9 and has a diameter greater than that of the bore 9. The tube 10 is externally flanged at its rear end, to prevent the disc 7 from sliding off the tube. The ball head 4 is provided at its front end with four radial recesses 14; when the coupling is connected (Figure 2) lubricant can flow through the tube 10 to the lubricating nipple opening and also can flow through these recesses 14 and around the disc 7 (this disc having moved away from the shoulder of the bore 9) and enter the annular space occupied by the spring 12 and transmit the pressure of the lubricating press to the leather collar 13 and the leather piston 11, whereby complete tightness, under the pressure of the lubricating press, against the end face of the lubricating nipple 5 round the lubricating aperture thereof, is obtained.

When on the other hand the coupling is released (Figure 3), if a flow of lubricant takes place the tube 10 is thereby driven towards the nipple-receiving opening of the coupling body until the disc 7, engaged by the flanged rear end of the tube 10 during this movement, comes into contact with the shoulder of the bore 9 and thus ensures that lubricant forced out by the pressure will not force the leather piston 11 and the leather collar 13 out of the bore 9 if the lubricant cannot at this moment escape through the tube 10 alone.

I claim:

A rapid coupling for connecting a lubricating press to a high-pressure lubricating nipple provided with a collar, comprising: a substantially cylindrical coupling body formed with a longitudinal bore, clamping jaws pivotally mounted on the external periphery of the coupling body and adapted to surround the adjacent end of the lubricating nipple and engage behind the collar thereof, a sleeve slidable on the coupling body outside the clamping jaws to lock them in their engaged position, a tube longitudinally slidable in the bore of the coupling body leaving an annular gap between the exterior of the tube and the interior of the bore, a head at the rear end of the coupling body adapted to be attached to a lubricating press, the head being formed with a passageway therethrough communicating both with the interior of the tube and with the annular gap between the tube and the bore, and a packing piston secured externally on the outlet end of the tube, slidably engaging in a fluidtight manner in the bore, and adapted to be pressed, by the supply pressure of the lubricant in the said annular gap, against the edge of the aperture of a lubricating nipple engaged by the said clamping jaws, the bore of the coupling body being enlarged at the rear end, a shoulder being formed at the change of cross section, and the coupling further comprising: a disc freely slidable upon the tube in the rear enlarged part of the bore, an external flange on the rear end of the tube, and a helical spring surrounding the tube in the bore, bearing at one end against the piston and at the other end against the disc, the disc being larger than the said bore but smaller than the enlarged bore, so that when the disc is not pressed away from the flange by the thrust of a lubricating nipple against the piston, acting through the helical spring, the supply pressure of the lubricant will press the flange against the shoulder, thus shutting off the supply of lubricant from the annular gap, and the interengagement of the flange, the disc and the shoulder will prevent the tube and the piston being forced out of the bore by the lubricant supply pressure.

References Cited in the file of this patent

UNITED STATES PATENTS

| | | |
|---|---|---|
| 1,977,847 | Gentle | Oct. 23, 1934 |
| 2,362,880 | Campbell | Nov. 14, 1944 |
| 2,578,517 | Davis | Dec. 11, 1951 |

FOREIGN PATENTS

| | | |
|---|---|---|
| 360,241 | France | Feb. 16, 1906 |